United States Patent
Shudo

(10) Patent No.: US 6,328,682 B1
(45) Date of Patent: Dec. 11, 2001

(54) HEAT-FIXING SILICONE RUBBER ROLLER

(75) Inventor: Shigeki Shudo, Annaka (JP)

(73) Assignee: Shin-Etsu Chemical CO LTD, Tokyo (JP)

( * ) Notice: Subject to any disclaimer, the term of this patent is extended or adjusted under 35 U.S.C. 154(b) by 0 days.

(21) Appl. No.: 09/580,527

(22) Filed: May 30, 2000

(30) Foreign Application Priority Data

May 28, 1999 (JP) .................................................. 11-149752

(51) Int. Cl.$^7$ ...................................................... H05B 1/00
(52) U.S. Cl. .................. 492/56; 492/53; 492/54; 219/216
(58) Field of Search .................................. 492/56, 59, 53, 492/54; 428/36.8, 421; 219/216; 126/263.01

(56) References Cited

U.S. PATENT DOCUMENTS

| | | | |
|---|---|---|---|
| 5,770,298 | 6/1998 | Nakamura et al. | 428/195 |
| 6,091,052 | * 7/2000 | Matsuo et al. | 219/216 |
| 6,096,429 | * 8/2000 | Chen et al. | 492/53 |
| 6,111,221 | * 8/2000 | Miyakoshi | 219/216 |
| 6,127,041 | * 10/2000 | Szostek et al. | 492/46 |
| 6,137,087 | * 10/2000 | Tomatsu | 219/216 |
| 6,137,986 | * 10/2000 | Sugino et al. | 399/333 |
| 6,148,170 | * 11/2000 | McMindes et al. | 492/56 |
| 6,231,954 | * 5/2001 | Yoshida et al. | 428/215 |

FOREIGN PATENT DOCUMENTS

| | | |
|---|---|---|
| 0 763 568 A2 | 3/1997 | (EP) . |
| 11-45022 | 2/1999 | (JP) . |
| 11-194643 | 7/1999 | (JP) . |

\* cited by examiner

Primary Examiner—I Cuda Rosenbaum
(74) Attorney, Agent, or Firm—Pillsbury Winthrop LLP

(57) ABSTRACT

A heat-fixing silicone rubber roller comprising a roller shaft, a silicone rubber layer provided on the outer periphery of the roller shaft, and at least one of a fluorine resin layer and a fluorine rubber layer, provided on the outer periphery of the silicone rubber layer. The silicone rubber layer comprises a cured product of a silicone rubber composition containing at least (A) an organopolysiloxane with an average molecular weight of from 30,000 to 100,000, having in one molecule at least two alkenyl groups bonded to silicon atoms; (B) an organohydrogenpolysiloxane having in one molecule at least two hydrogen atoms bonded to silicon atoms; the hydrogen atoms bonded to silicon atoms being in the weight that is from 0.1 to 3.0 equivalent weight per one alkenyl group in the component (A); and (C) a platinum group metal catalyst. The heat-fixing silicone rubber roller has a coating layer of fluorine resin and/or fluorine rubber excellent in interlaminar adhesion and durability.

12 Claims, No Drawings

HEAT-FIXING SILICONE RUBBER ROLLER

BACKGROUND OF THE INVENTION

1. Field of the Invention

This invention relates to a heat-fixing silicone rubber roller used in copying machines, laser beam printers, fax machines and so forth. More particularly, it relates to a fixing silicone rubber roller having a silicone rubber layer provided on its outer periphery with a fluorine resin layer and/or a fluorine rubber layer.

2. Description of the Prior Art

As fixing rollers used in copying machines, laser beam printers, fax machines and the like, conventionally used are silicone rubber rollers comprising a roller shaft (a mandrel) and a silicone rubber surface layer provided on the former's outer periphery. This is because silicone rubber has toner releasability, heat resistance, compression set and so forth which are superior to those of other rubber materials.

In recent years, as machinery of this type has been made high-speed, oil fusing which feeds silicone oil to the surface of a fixing roller is carry out for the purpose of improving toner releasability. Also, rubber materials are being made to have low hardness so that, at the time of high-speed fixing, fixing width (nip width) can be ensured to increase the time taken for fixing.

However, since the silicone rubber has originally the same quality as the silicone oil and moreover has been made low-hardness, there is a problem that it may be swelled with the silicone oil fused. As a means for solving this problem, fluorine resin and/or fluorine rubber is/are further provided by coating, on the surface of a silicone rubber roller whose surface layer is formed of a silicone rubber or silicone rubber foam having a low hardness, or the above silicone rubber layer is covered with a fluorine resin tube to provide a fluorine resin layer on the outer periphery of the silicone rubber layer.

Such a means brings about a remarkable improvement in service life as fixing rollers. However, the coating of fluorine resin requires a high temperature exceeding the melting temperature of fluorine resin. Also, the coating of fluorine rubber requires high-temperature baking carried out at 300 to 350° C. for 15 minutes to 1 hour after coating. In such a condition of high temperature, however, the silicone rubber layer may deteriorate in part to damage adhesion between the fluorine resin layer or fluorine rubber layer and the silicone rubber layer. Moreover, the fixing roller thus obtained has had a problem on durability. The silicone rubber roller covered with a fluorine resin tube to provide a fluorine resin layer on the outermost layer also has had a problem that the fluorine resin layer (tube) and silicone rubber layer may come off with an increase in the number of paper feed. In particular, those having a low-hardness silicone rubber layer may greatly cause these problems. Accordingly, it has been a pressing need to make development of a fixing silicone rubber roller having a coating layer of fluorine resin and/or fluorine rubber, which has both superior interlaminar adhesion and superior durability.

SUMMARY OF THE INVENTION

An object of the present invention is to provide a fixing silicone rubber roller having a silicone rubber layer provided on its outer periphery with a fluorine resin layer and/or a fluorine rubber layer, having both superior interlaminar adhesion between the fluorine resin layer or fluorine rubber layer and the silicone rubber layer and superior durability of the fixing roller.

To achieve the above object, the present invention provides a heat-fixing silicone rubber roller comprising a roller shaft, a silicone rubber layer provided on the outer periphery of the roller shaft, and at least one of a fluorine resin layer and a fluorine rubber layer, provided on the outer periphery of the silicone rubber layer;

the silicone rubber layer comprising a cured product of a silicone rubber composition comprising:

(A) an organopolysiloxane with an average molecular weight of from 30,000 to 100,000, having in one molecule at least two alkenyl groups bonded to silicon atoms;

(B) an organohydrogenpolysiloxane having in one molecule at least two hydrogen atoms bonded to silicon atoms; the hydrogen atoms bonded to silicon atoms being present in an amount of from 0.1 to 3.0 equivalent weight per one alkenyl group in the component (A); and (C) a platinum group metal catalyst.

The silicone rubber layer may preferably have a rubber hardness according to JIS K 6249 of 20 or below.

DETAILED DESCRIPTION OF THE PREFERRED EMBODIMENTS

The heat-fixing silicone rubber roller of the present invention is a fixing roller constituted chiefly of a silicone rubber layer and at least one of a fluorine resin layer and a fluorine rubber layer, provided on the outer periphery of the silicone rubber layer. The silicone rubber layer is a specific silicone rubber composition.

Main parts of the fixing roller of the present invention will now be described below.

Silicone Rubber Layer

The silicone rubber layer is provided on the outer periphery of a roller shaft. To form this silicone rubber layer, a liquid addition-curable silicone rubber composition comprising (A) an organopolysiloxane with an average molecular weight of from 30,000 to 100,000, having in one molecule at least two alkenyl groups bonded to silicon atoms; (B) an organohydrogenpolysiloxane having in one molecule at least two hydrogen atoms bonded to silicon atoms (i.e., SiH groups); the hydrogen atoms bonded to silicon atoms being present in an amount of from 0.1 to 3.0 equivalent weight (i. e., from 0.1 to 3.0 atoms) per one alkenyl group in the component (A); and (C) a platinum group metal catalyst, is coated on the outer periphery of a roller shaft made of a metal such as aluminum, iron or stainless steel, followed by heat curing. In this case, in order to improve the adhesion (adhesive power) between the roller shaft and the silicone rubber layer, the roller shaft surface may preferably be beforehand primer-treated with a known primer, in particular, a primer for silicone rubbers.

The silicone rubber layer (i.e., a layer formed of a cured product of the silicone rubber composition) thus obtained preferably has a rubber hardness (JIS K 6249) of 20 or below.

The components that constitute this silicone rubber composition will be detailed below.

(A) Alkenyl Group-containing Organopolysiloxane:

The component-(A) Alkenyl group-containing organopolysiloxane is a known organopolysiloxane usually used as a base polymer for addition-curable silicone rubber compositions. This organopolysiloxane has a viscosity of from 5,000 to 300,000 cP (centipoise) at 25° C., and is a compound represented by the general compositional formula (I):

$R_a SiO_{(4-a)/2}$ (wherein R's each represent a substituted or unsubstituted monovalent hydrocarbon group bonded to a silicon atom, and a represents a number of from 1.9 to 2.4, and preferably from 1.95 to 2.05).

In the general compositional formula (I), as examples of the substituted or unsubstituted monovalent hydrocarbon group represented by R, it may include alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group and a dodecyl group; cycloalkyl groups such as a cyclopentyl group, a cyclohexyl group and a cycloheptyl group; alkenyl groups such as a vinyl group, an allyl group, a propenyl group, an isopropenyl group, a butenyl group, an isobutenyl group, a hexenyl group, a cyclohexenyl group and a cycloheptenyl group; aryl groups such s a phenyl group, a tolyl group, a xylyl group, a naphthyl group and a biphenylyl group; aralkyl groups such as a benzyl group, a phenylethyl group, a phenylpropyl group and a methylbenzyl group; and halogen-substituted or cyano-substituted hydrocarbon groups such as a chloromethyl group, a 2-bromoethyl group, 3-chloropropyl group, a 3,3,3-trifluoropropyl group, a chlorophenyl group, a fluorophenyl group, a cyanoethyl group and a 3,3,4,4,5,5,6,6,6-nonafluorohexyl group. These substituted or unsubstituted monovalent hydrocarbon groups R's may preferably be those having 1 to 12 carbon atoms, and particularly 1 to 8 carbon atoms, and may be the same or different, provided that at least two alkenyl groups must be present in one molecule. These alkenyl groups may be those bonded to any of the silicon atom present at a molecular-chain terminal and a silicon atom present along the molecular chain, or may be those bonded to the both. They preferably include at least alkenyl groups bonded to the silicon atoms present at both terminals of the molecular chain.

Among the alkenyl groups exemplified above, a vinyl group is preferred. Also, among monovalent hydrocarbon groups R's other than the alkenyl groups, a methyl group, a phenyl group, and a 3,3,3-trifluoropropyl group are preferred.

This organopolysiloxane may be of a straight chain, or a branched chain containing an $RSiO_{3/2}$ unit [R is as defined in the general compositional formula (I)] or an $SiO_{4/2}$ unit. Usually, it is preferably a straight-chain organopolysiloxane terminated with triorganosiloxyl groups at both terminals of the molecular chain and having a molecular backbone chain consisting basically of the repetition of a diorganosiloxane unit (i.e., $R_2SiO_{2/2}$ unit).

The component-(A) organopolysiloxane can be produced by known processes. For example, it can be obtained by subjecting an organocyclopolysiloxane and a hexaorganodisiloxane to equilibration reaction in the presence of an acid catalyst.

Examples of the component (A) include

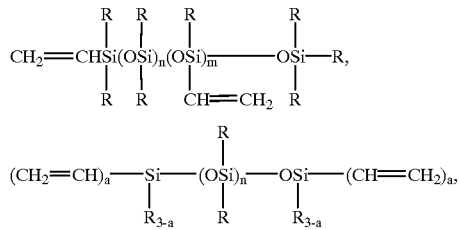

-continued

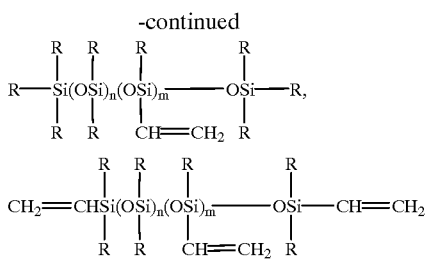

wherein in the above formulas, R's are the same as the groups other than the alkenyl group represented by R in the general compositional formula (I); n is an integer of from 300 to 1, 500, and preferably from 400 to 1,300; m is an integer of from 1 to 200, and preferably from 2 to 100; and a is 1, 2 or 3.

The Alkenyl group-containing organopolysiloxane as described above may be used alone or in the form of a mixture of two or more types, provided that it has an average molecular weight (in the case of a mixture, average molecular weight of the mixture) within the range of from 30,000 to 100,000, and preferably from 30,000 to 80,000 as weight-average molecular weight in terms of polystyrene as measured by GPC (gel permeation chromatography). If this organopolysiloxane has an average molecular weight smaller than 30,000, it may greatly deteriorate in high-temperature conditions of 300° C. or above to damage the adhesion between the fluorine resin and/or fluorine rubber coating layer and the silicone rubber layer, resulting in a low durability of the fixing roller obtained. In the case of the silicone rubber roller covered with a fluorine resin tube to provide a fluorine resin layer on the outermost layer, the same phenomenon as the above may take place to damage the adhesion between the fluorine resin layer (tube) and the silicone rubber layer, resulting in a low durability of the fixing roller. If on the other hand the organopolysiloxane has an average molecular weight larger than 100,000, it may have so high a release effect as to lower the interlaminar adhesion, so that the fixing roller obtained may cause an elongation of its silicone rubber layer to make the fixing unstable.

The alkenyl group-containing organopolysiloxane of the component (A) has a polydispersity in respect of molecular weight in the range of 1.0 to 3.0, preferably 1.0 to 2.0, more preferably 1.0 to 1.7, the polydispersity being defined as a ratio of weight-average molecular weight (Mw) to number-average molecular weight (Mn), i.e. Mw/Mn. A polydispersity more than 3.0 may lower the adhesion between the coating layer of the fluorine resin or fluorine rubber and the silicone rubber layer, thereby bringing about a lowering of the resulting fixing roller durability.

(B) Organohydrogenpolysiloxane:

The component-(B) organohydrogenpolysiloxane acts as a cross-linking agent in the addition (hydrosilylation) reaction of the alkenyl groups in the component-(A) Alkenyl group-containing organopolysiloxane with the hydrogen atoms bonded to silicon atoms (SiH groups) in the component (B). As this organohydrogenpolysiloxane, there are no particular limitations on its molecular structure. Those of various types as exemplified by linear, cyclic, branched and three-dimensional network structures may be used, which are conventionally manufactured, provided that it must have at least two, and preferably at least three, hydrogen atoms bonded to silicon atoms, i.e., SiH groups. Groups bonded to silicon atoms, other than the SiH groups, are the same substituted or unsubstituted monovalent hydrocarbon groups as those represented by R in the general compositional formula (I). Those not containing any aliphatic unsaturated bonds such as alkenyl groups are preferred. In particular, a methyl group and a phenyl group are preferred.

As the organohydrogenpolysiloxane of the component (B), the compound represented by the following general compositional formula (II):

$$(R^1)_b H_c SiO_{(4-b-c)/2} \tag{II}$$

wherein $R^1$ is an unsubstituted or halogen-substituted monovalent $C_1$–$C_{10}$ hydrocarbon group having no aliphatic unsaturation, b is a number of 0.7 to 2.1, preferably 1.0 to 2.0, c is a number of 0.002 to 1.0, preferably 0.01 to 1.0, provided that b+c amounts to a number of 0.8 to 3.0, preferably 1.0 to 2.7. There is no limitation on the molecular weight of the (B)-component organohydrogenpolysiloxane. However, it is preferably liquid at ambient temperature (25° C.), and more preferably it has a viscosity at 25° C. of about 0.1 to about 5,000 cP (centipoise), still more preferably about 0.5 to about 1,000 cP.

$R^1$ in the general compositional formula (II) includes, for example, the unsubstituted or halogen-substituted monovalent hydrocarbon groups among those exemplified in respect of R in the general formula (I), except for the unsubstituted or substituted alkenyl groups. Preferred $R^1$ includes alkyl groups such as a methyl group, aryl groups such as a phenyl group, and halogen-substituted alkyl groups such as a 3,3,3-trifluoropropyl group.

The component (B) may be added in such an amount that the SiH groups in the component (B) are present in an amount of from 0.1 to 3.0 equivalent weight (i.e., from 0.1 to 3.0 groups), and preferably from 0.5 to 2.0 equivalent weight, per one alkenyl group contained in the component (A). If it is less than 0.1 equivalent weight, a cured silicone rubber obtained may have excessively a low cross-link density, so that the heat resistance of the cured silicone rubber may be adversely affected. Also, if it is more than 3.0 equivalent weight, a problem of foaming due to dehydration reaction may occur thereby also likewise adversely affecting the heat resistance.

The component-(B) organohydrogenpolysiloxane can be produced by known processes. For example, according to a production process most commonly used, it can readily be obtained by subjecting octamethylcyclotetrasiloxane and/or tetramethylcyclotetrasiloxane and also a compound containing hexamethyldisiloxane unit or 1,1'-dihydro-2,2',3,3'-tetramethyldisiloxane unit that makes up a terminal group, to equilibration reaction in the presence of an acid catalyst such as sulfuric acid, trifluoromethanesulfonic acid or methanesulfonic acid at a temperature of from about −10° C. to about +40° C. The component (B) thus obtained may be used alone or in the form of a mixture of two or more.

The component-(B) organohydrogenpolysiloxane may specifically include, e.g., siloxane oligomers such as 1,1,3,3-tetramethyldisiloxane, 1,3,5,7-tetramethylcyclotetrasiloxane and 1,3,5,7,8-pentamethylcyclopentasiloxane; polysiloxanes such as methylhydrogenpolysiloxanes terminated with trimethylsiloxyl groups at both terminals of the molecular chain, dimethylsiloxane-methylhydrogensiloxane copolymers terminated with trimethylsiloxyl groups at both terminals of the molecular chain, methylhydrogenpolysiloxanes terminated with silanol groups at both terminals of the molecular chain, dimethylsiloxane-methylhydrogensiloxane copolymers terminated with silanol groups at both terminals of the molecular chain, dimethylpolysiloxanes terminated with dimethylhydrogensiloxyl groups at both terminals of the molecular chain, methylhydrogenpolysiloxanes terminated with dimethylhydrogensiloxyl groups at both terminals of the molecular chain, and dimethylsiloxane-methylhydrogensiloxane copolymers terminated with dimethylhydrogensiloxyl groups at both terminals of the molecular chain; and silicone resins which consist of an $(R^1)_2(H)SiO_{1/2}$ unit and an $SiO_{4/2}$ unit and may optionally contain an $(R^1)_3SiO_{1/2}$ unit, an $(R^1)_2SiO_{2/2}$ unit, an $R^1(H)SiO_{2/2}$ unit, an $(H)SiO_{3/2}$ unit or an $R^1SiO_{3/2}$ unit (in the formulas, $R^1$'s are the same as those represented by $R^1$'s in the general compositional formula (II)).

(C) Platinum Group Metal Catalyst:

The component-(C) platinum group metal catalyst is used as a catalyst that accelerates the curing caused by the addition reaction (hydrosilylation reaction) of the component-(A) with the component-(B). This platinum group metal catalyst may be any known catalyst, as exemplified by platinum catalysts such as platinum black, chloroplatinic acid, alcohol-modified products of chloroplatinic acid, and complexes of chloroplatinic acid with olefins, aldehydes, vinylsiloxanes or acetylene alcohols; palladium catalysts such as tetrakis(triphenylphosphine)palladium; and rhodium catalysts such as rhodium-olefin complexes and chlorotris(triphenylphosphine)rhodium. It may be added in what is called a catalytically effective quantity, which may appropriately be made large or small in accordance with the desired curing rate. Stated specifically, it may usually be in an amount ranging from 0.1 to 1,000 ppm, and preferably from 1 to 200 ppm, in terms of platinum metal based on the weight of the component (A).

Optional Components:

To the silicone rubber composition described above, a filler, a heat resistance improver, a reaction retarder and so forth may be added as other optional components.

The filler, Particularly a silica-based inorganic filler, is a component that imparts to the liquid addition-curable silicone rubber composition a stated hardness and a physical strength such as tensile strength, and may be any of those used usually in conventional silicone rubber compositions. Stated specifically, it may include, e.g., hydrophilic silica such as fumed silica and precipitated silica, hydrophobic silica obtained by hydrophobic-treating these hydrophilic silica, and crystalline silica or quartz powders. Any of these may be used alone or in the form of mixture of two or more. Commercially available products of the hydrophilic silica may include AEROSIL 130, 200, 300 (available from Nippon Aerosil Co., Ltd. or Degussa Japan Co., Ltd.); CABOSIL MS-5, MS-7, (available from Cabot Corp.); RHEOROSIL QS-102, QS-103 (available from Tokuyama Soda Co., Ltd.); and NIPSIL LP (available from Nippon Silica Industrial Co., Ltd.). Commercially available products of the hydrophobic silica may include AEROSIL R-812, R-812S, R-972, R-974 (available from Degussa Japan Co., Ltd.); RHEOROSIL MT-10 (available from Tokuyama Soda Co., Ltd.); and NIPSIL SS series (available from Nippon Silica Industrial Co., Ltd.). Commercially available products of the crystalline silica may include CRYSTALITE (available from K.K. Tatsumori); and MINUSIL, IMISIL (available from Illinois Mineral Co.). The filler may be added in an amount of from 0 to 300 parts by weight, preferably from 5 to 300 parts by weight, and more preferably from 20 to 200 parts by weight, based on 100 parts by weight of the component (A).

The heat resistance improver may include, e.g., carbon black, cerium oxide, cerium hydroxide and iron oxide. Any of these may be used alone or in the form of mixture of two or more types.

The carbon black can be classified into furnace black, channel black, acetylene black, thermal black and so forth in accordance with its production processes. Since, however, those having sulfur or amine in a large content may inhibit the addition curing reaction of the silicone rubber composition, acetylene black may particularly preferably be used, as having less sulfur or amine. The carbon black may be added in an amount of from 0 to 15 parts by weight, preferably from 0.2 to 15 parts by weight, and more preferably from 2 to 10 parts by weight, based on 100 parts by weight of the component (A).

As the iron oxide. black iron oxide ($Fe_3O_4$) and red iron oxide ($Fe_2O_3$ are preferred. The iron oxide may be added in an amount of from 0 to 30 parts by weight, preferably from 0.2 to 30 parts by weight, and more preferably from 2 to 20 parts by weight, based on 100 parts by weight of the component (A).

The cerium oxide and/or cerium hydroxide can act synergistically when added together with carbon black and iron oxide, to keep the silicone rubber composition from undergoing changes in hardness. The cerium oxide and/or cerium hydroxide may be added in an amount of from 0 to 5 parts by weight, preferably from 0.1 to 5 parts by weight, and more preferably from 0.2 to 2 parts by weight, based on 100 parts by weight of the component (A).

Any of the above optional components may be used alone or in the form of mixture of two or more types.

When it is necessary to control curing time in order to put the above components (A) to (C) and optional components into practical use, the reaction retarder may further be used which may include vinyl group-containing organopolysiloxanes such as vinylcyclotetrasiloxane; triallylisocyanurate, alkyl maleates, acetylene alcohols and silane- or siloxane-modified products thereof, hydroperoxide, tetramethylethylenediamine, benzotriazole, and mixtures of these.

Fluorine Resin and/or Fluorine Rubber Coating Layer(s)

The fluorine resin layer and/or fluorine rubber layer is/are provided on the outer periphery of the silicone rubber layer described above. To form such a coating layer(s) of fluorine resin and/or fluorine rubber, the fluorine resin and/or fluorine rubber (e.g., in the form of a latex or latexes) may be coated on the outer periphery of the silicone rubber layer in the manner as conventionally employed. More specifically, in the case when fluorine resin is used, the resin may be coated in a molten condition where it has been heated to the melting temperature or above. In the case when fluorine rubber is used, the fluorine rubber may be coated and thereafter baked in a high-temperature condition as conventionally done (at 280 to 320° C. for 15 minutes to 1 hour when, e.g., Dyel Latex, available from Daikin Industries, Ltd., is used as the fluorine rubber). Also, using both the fluorine resin and the fluorine rubber, the fluorine resin may be coated in a molten condition in the manner as described above and thereafter the fluorine rubber may be coated thereon, followed by baking at a high temperature, or conversely the fluorine rubber may be coated, followed by baking at a high temperature, and thereafter the fluorine resin may be coated in a molten condition. In the case of a silicone rubber roller covered with a fluorine resin tube to provide a fluorine resin layer on the outer periphery of the silicone rubber layer, it can be obtained by setting a roller shaft (mandrel) and a fluorine resin tube in a mold and injecting the silicone rubber composition to the space between the roller shaft and the fluorine resin tube, followed by curing. In this case, the inner surface of the fluorine resin tube may previously be treated by, e.g., sodium-naphthalene treatment, sputter etching, or corona discharge treatment to more strengthen the adhesion between the fluorine resin layer (tube) and the silicone rubber layer.

The fluorine resin or fluorine resin tube used here may include, e.g., polytetrafluoroethylene (PTFE), a tetrafluoroethylene/hexafluoropropylene copolymer (FEP), tetrafluoroethylene/perfluoroalkyl vinyl ether copolymers (PFA), polychlorotrifluoroethylene (PCTFE), polyvinylidene fluoride, polyvinyl fluoride, and an ethylene/chlorotrifluoroethylene copolymer (ECTFE), or tubes of these. The fluorine rubber may include vinylidene fluoride type fluorine rubbers, propylene/tetrafluoroethylene type fluorine rubbers, tetrafluoroethylene/perfluoroalkyl vinyl ether type fluorine rubbers, thermoplastic fluorine rubbers and fluorosilicone rubbers. These are available in the form of heat-shrinkable tubings, films, water-based coating materials, organic-solvent coating materials, powder coating materials and so forth.

Thus, the coating layer(s) of fluorine resin and/or fluorine rubber having a higher hardness than the silicone rubber layer is/are formed. In the present invention, in order to improve the adhesion to the silicone rubber layer, the surface of the silicone rubber layer may preferably be beforehand treated with a primer before the coating of the fluorine resin and/or fluorine rubber. In this primer treatment, a known primer, and preferably a primer for fluorine rubber may be used alone or may be used in the form of a mixture of the primer and the fluorine rubber. In the case of the silicone rubber roller covered with a fluorine resin tube, the inner surface of the fluorine resin tube may be subjected to primer treatment and thereafter the silicone rubber composition may be injected, followed by curing and molding to effect adhesion between them.

EXAMPLES

The present invention will be described below in greater detail by giving Examples. The present invention is by no means limited to these. In the following, viscosity is expressed as viscosity at 25° C. Me in formulas represents a methyl group. "Average molecular weight" means weight-average molecular weight (Mw), and "polydispersity" means a ratio of weight-average molecular weight (Mw) to number-average molecular weight (Mn), i.e, Mw/Mn.

Silicone Rubber Composition

Preparation Example 1 (by weight)

Straight-chain dimethylpolysiloxane terminated with trimethylsilyl groups at both terminals, containing about 5 pendent vinyl groups as methylvinylsiloxane units on the average and having (1) an Mw of 30,000 and a polydispersity of 1.5, (2) an Mw of 50,000 and a polydispersity of 1.5, (3) an Mw of 80,000 and a polydispersity of 1.6, or (4) an Mw of 100,000 and a polydispersity of 1.6
100 parts Methylhydrogenpolysiloxane with a viscosity of about 10 cP, represented by the following formula (II) 3 parts

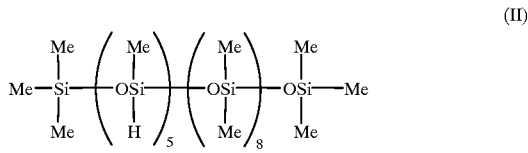

(II)

Methylvinylpolysiloxane with a viscosity 0f 1,000 cP, containing 5 mole % of vinyl groups [—Si(CH=$CH_2$)

(CH$_3$)O— units] bonded to silicon atoms present along the molecular chain 4 parts Platinum-vinylsiloxane complex 50 ppm (as platinum atoms) Crystalline silica (average particle diameter: 4 μm)10 parts 1-Ethynyl-1-cyclohexanol as a reaction retarder 0.1 part Iron oxide 2 parts The above materials were mixed well to make up uniform mixtures, thus liquid compositions 1-(1), 1-(2), 1-(3)and 1-(4), respectively, were prepared.

Silicone Rubber Composition

Preparation Example 2 (by weight)

Straight-chain dimethylpolysiloxane terminated with dimethylvinylsiloxyl groups at both terminals and having (1) an Mw of 30,000 and a polydispersity of 1.6, (2) an Mw of 50,000 and a polydispersity of 1.6, (3) an Mw of 80,000 and a polydispersity of 1.7, or (4) an Mw of 100,000 and a dispersity of 1.7. 100 parts
Methylhydrogenpolysiloxane with a viscosity of about 10 cP, represented by the following formula (III) 3 parts

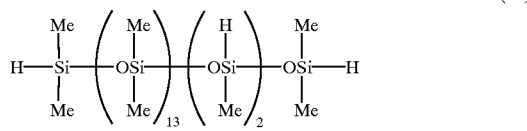

(III)

Methylvinylpolysiloxane with a viscosity of 1,000 cP, containing 5 mole % of vinyl groups [—Si(CH=CH$_2$)(CH$_3$)O— units] bonded to silicon atoms present along the molecular chain 4 parts Platinum-vinylsiloxane complex 50 ppm (as platinum atoms) Crystalline silica (average particle diameter: 4 μm) 10 parts 1-Ethynyl-1-cyclohexanol as a reaction retarder 0.1 part Iron oxide 2 parts The above materials were mixed well to make up uniform mixtures, thus liquid compositions 2-(1), 2-(2), 2-(3) and 2-(4), respectively, were prepared.

Example 1

Rubber Hardness and Adhesion Tests

The liquid composition 1-(1), 1-(2), 1-(3) or 1-(4) was pre-cured at 150° C. for 30 minutes, and was further post-cured at 200° C. for 4 hours to obtain a sheetlike cured product of 2 mm thick. The hardness of the cured product thus obtained was measured with a rubber hardness meter (durometer type-A prescribed in JIS 6249) to obtain results shown in Table 1. Next, on the surface of this cured product, a primer for fluorine rubber, GLP-103SR (trade name; available from Daikin Industries, Ltd.), was uniformly coated, followed by heating at 80° C. for 10 minutes to effect primer treatment. Thereafter, Dyel Latex GLS-213 (trade name; available from Daikin Industries, Ltd.) was uniformly spray-coated thereon, followed by heating at 300° C. for 1 hour to carry out baking to form a fluorine rubber coating layer of 20 μm thick. Then, the adhesion between the cured product of the silicone rubber composition and the coating layer was evaluated to obtain the results shown in Table 1.

Evaluation of Adhesion:

The fluorine rubber coating layer was peeled from the silicone rubber sheet in the vertical direction and how they stood when peeled was evaluated according to the following criteria. O: The silicone rubber layer and the fluorine rubber coating layer stood adhered strongly at their interface, and the silicone rubber layer caused cohesive failure.

Δ: The silicone rubber layer and the fluorine rubber coating layer stood peeled partly at their interface, but the greater part of the silicone rubber layer caused cohesive failure.

X: The fluorine rubber coating layer was easily peelable from the silicone rubber layer.

TABLE 1

| Liquid composition: | 1-(1) | 1-(2) | 1-(3) | 1-(4) |
|---|---|---|---|---|
| Molecular weight of component (A): | 30,000 | 50,000 | 80,000 | 100,000 |
| Rubber hardness of cured product: | 18 | 15 | 10 | 5 |
| Adhesion between cured product and fluorine rubber coating layer | ○ | ○ | ○ | Δ or ○ |

Production of Fixing Roller

A primer for liquid addition-curable silicone rubber, No.101A/B (trade name; available from Shin-Etsu Chemical Co., Ltd.), was coated on an aluminum shaft of 24 mm diameter and 300 mm long, followed by heating at 150° C. for 30 minutes to effect primer treatment. Thereafter, the liquid composition 1-(1), 1-(2), 1-(3) or 1-(4) was coated thereon, followed by heating at 150° C. for 30 minutes to effect curing, further followed by post-curing at 200° C. for 4 hours to form a silicone rubber layer of 2 mm thick. On the surface of this silicone rubber layer, a primer for fluorine rubber, GLP-103SR (trade name; available from Daikin Industries, Ltd.), was uniformly coated, followed by heating at 80° C. for 10 minutes to effect primer treatment. Thereafter, Dyel Latex GLS-213 (trade name; available from Daikin Industries, Ltd.) was further uniformly spray-coated thereon, followed by baking at 300° C. for 1 hour to form a fluorine rubber coating layer of 10 μm thick. Thus, a low-hardness silicone rubber roller with a fluorine rubber coating was produced which was 28 mm external diameter and 250 mm long.

Next, this silicone rubber roller was set in a printer as a fixing roller, and copying life was evaluated to obtain the results shown in Table 2.

TABLE 2

| Liquid composition: | | | | |
|---|---|---|---|---|
| Molecular weight of component (A): | 1-(1) 30,000 | 1-(2) 50,000 | 1-(3) 80,000 | 1-(4) 100,000 |
| Number of printed sheets | 100,000 or more | 100,000 or more | 100,000 or more | 80,000 to 85,000 |

Comparative Example 1

Liquid silicone rubber compositions were prepared in the same manner as in Preparation Example 1 except that the straight-chain dimethylpolysiloxane terminated with trimethylsilyl groups at both terminals was replaced with one having an Mw of 27,000 and a polydispersity of 1.5 or another one having an Mw of 120,000 and a polydispersity of 1.6. Rubber hardness and adhesion tests were made similarly. Also, fixing rollers were produced and copying life was evaluated in the same manner as in Example 1, to obtain the results shown in Table 3.

TABLE 3

| Comparative liquid composition: Molecular weight of component (A): | 27,000 | 120,000 |
|---|---|---|
| Rubber hardness of cured product: | 20 | 3 |
| Adhesion between cured product and fluorine rubber coating layer | X | X |
| Number of printed sheets | 10,000 or less | 5,000 or less |

Example 2

Adhesion was tested in the same manner as in Example 1 except that the liquid composition was replaced with the liquid composition 2-(1), 2-(2), 2-(3) or 2-(4). Results obtained are shown in Table 4.

TABLE 4

| Liquid composition: Molecular weight of component (A): | 2-(1) 30,000 | 2-(2) 50,000 | 2-(3) 80,000 | 2-(4) 100,000 |
|---|---|---|---|---|
| Rubber hardness of cured product: | 15 | 13 | 10 | 7 |
| Adhesion between cured product and fluorine rubber coating layer | ○ | ○ | ○ | Δ or ○ |

Production of Fixing Roller

A low-hardness silicone rubber roller with a fluorine rubber coating of 28 mm external diameter and 250 mm long was produced in the same manner as in Example 1 except that the liquid composition was replaced with the liquid composition 2-(1), 2-(2), 2-(3) or 2-(4).

Next, this silicone rubber roller was set in a printer as a fixing roller, and copying life was evaluated to obtain the results shown in Table 5.

TABLE 5

| Liquid composition: Molecular weight of component (A): | 2-(1) 30,000 | 2-(2) 50,000 | 2-(3) 80,000 | 2-(4) 100,000 |
|---|---|---|---|---|
| Number of printed sheets | 100,000 or more | 100,000 or more | 100,000 or more | 80,000 to 85,000 |

Comparative Example 2

Liquid silicone rubber compositions were prepared in the same manner as in Preparation Example 2 except that the straight-chain dimethylpolysiloxane terminated with dimethylvinylsiloxyl groups at both terminals was replaced with one having an Mw of 27,000 and a polydispersity of 1.6 or another one having an Mw of 120,000 and a polydispersity of 1.7. Rubber hardness and adhesion tests were made similarly. Also, fixing rollers were produced and copying life was evaluated in the same manner as in Example 1, to obtain the results shown in Table 6.

TABLE 6

| Comparative liquid composition: Molecular weight of component (A): | 27,000 | 120,000 |
|---|---|---|
| Rubber hardness of cured product: | 18 | 3 |
| Adhesion between cured product and fluorine rubber coating layer | X | X |
| Number of printed sheets | 5,000 or less | 5,000 or less |

Example 3

A primer for liquid addition-curable silicone rubber, No.101A/B (trade name; available from Shin-Etsu Chemical Co., Ltd.), was coated on an aluminum shaft of 24 mm diameter and 300 mm long, followed by heating at 150° C. for 30 minutes to effect primer treatment. This aluminum shaft and a PFA resin tube of 25 μm thick the inner surface of which was treated by sodium-naphthalene treatment were set in a mold, and the liquid composition 1-(1), 1-(2), 1-(3) or 1-(4) was injected into the space between the aluminum shaft and the PFA resin tube, followed by heating at 150° C. for 30 minutes to effect curing, and further followed by post-curing at 200° C. for 4 hours. Thus, a FPA-resin-coated low-hardness silicone rubber roller, covered with an PFA resin layer (tube) of 25 μm thick on its surface, was produced which was 28 mm external diameter and 250 mm long.

Next, this silicone rubber roller was set in a printer as a fixing roller, and copying life was evaluated to obtain the results shown in Table 7.

TABLE 7

| Liquid composition: Molecular weight of component (A): | 1-(1) 30,000 | 1-(2) 50,000 | 1-(3) 80,000 | 1-(4) 100,000 |
|---|---|---|---|---|
| Number of printed sheets | 100,000 or more | 100,000 or more | 100,000 or more | 70,000 to 75,000 |

Comparative Example 3

Liquid silicone rubber compositions were prepared in the same manner as in Preparation Example 1 except that the straight-chain dimethylpolysiloxane terminated with trimethylsilyl groups at both terminals was replaced with one having an Mw of 27,000 and a dispersity of 1.5 or another one having an Mw of 120,000 and a dispersity of 1.6. Also, fixing rollers were produced and copying life was evaluated in the same manner as in Example 3, to obtain the results shown in Table 8.

TABLE 8

| Comparative liquid composition: Molecular weight of component (A): | 27,000 | 120,000 |
|---|---|---|
| Number of printed sheets | 10,000 or less | 10,000 or less |

As described above, the fixing silicone rubber roller of the present invention, provided with the coating layer(s) of fluorine resin and/or fluorine rubber, has superior adhesion between the fluorine resin layer and/or fluorine rubber layer and the silicone rubber layer and also promises superior durability of the roller. Accordingly, it is very useful as a fixing roller used in copying machines, laser beam printers, fax machines and so forth.

What is claimed is:

1. A heat-fixing silicone rubber roller comprising a roller shaft, a silicone rubber layer provided on the outer periphery of the roller shaft, and at least one of a fluorine resin layer and a fluorine rubber layer, provided on the outer periphery of the silicone rubber layer;

said silicone rubber layer comprising a cured product of a silicone rubber composition comprising:

(A) an organopolysiloxane with an average molecular weight of from 30,000 to 100,000, having in one molecule at least two alkenyl groups bonded to silicon atoms;

(B) an organohydrogenpolysiloxane having in one molecule at least two hydrogen atoms bonded to silicon atoms; the hydrogen atoms bonded to silicon atoms being present in an amount of from 0.1 to 3.0 equivalent weight per one alkenyl group in the component (A); and (C) a platinum group metal catalyst.

2. The heat-fixing silicone rubber roller according to claim 1, wherein the organopolysiloxane of the component (A) has a viscosity at 25° C. of 5,000 to 300,000 and is represented by the general compositional formula (I):

$$R_aSiO_{(4-a)/2} \quad (I)$$

wherein R's each represent a substituted or unsubstituted monovalent hydrocarbon group bonded to a silicon atom, and a represents a number of from 1.9 to 2.4.

3. The heat-fixing silicone rubber roller according to claim 2, wherein the substituted or unsubstituted monovalent hydrocarbon group represented by the R has 1 to 12 carbon atoms.

4. The heat-fixing silicone rubber roller according to claim 2, wherein R's are each an alkyl group, a cycloalkyl group, an alkenyl group, a cycloalkenyl group, an aryl group, an aralkyl group, or a corresponding hydrocarbon group substituted by a halogen atom or a cyano group.

5. The heat-fixing silicone rubber roller according to claim 1, wherein the organopolysiloxane of the component (A) is in a substantially linear form and has silicon-bonded alkenyl groups at least at the both terminal ends of the linear molecular chain.

6. The heat-fixing silicone rubber roller according to claim 5, wherein said alkenyl groups are vinyl groups and other organic groups present in the organopolysiloxane of the component (A) are a methyl group a phenyl group or a 3,3,3-trifluoropropyl group.

7. The heat-fixing silicone rubber roller according to claim 1, wherein said organopolysiloxane of the component (A) is represented by at least one formula of the formulas:

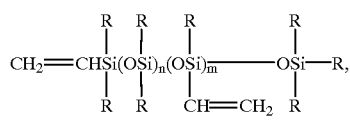

-continued

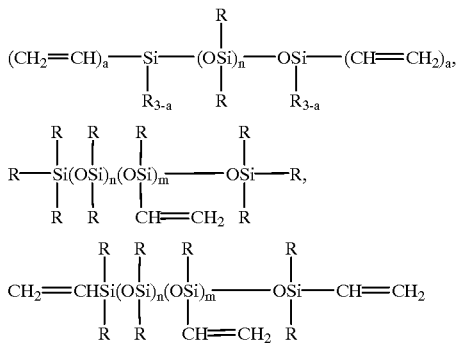

wherein in the above formulas, R's are the same as the groups other than the alkenyl group represented by R in the general compositional formula (I) recited in claim 2; n is an integer of from 300 to 1,500; m is an integer of from 1 to 200; and a is 1, 2 or 3.

8. The heat-fixing silicone rubber roller according to claim 1, wherein said organopolysiloxane of the component (A) has an weight-average molecular weight in terms of polystyrene as measured by GPC of from 30,000 to 100,000.

9. The heat-fixing silicone rubber roller according to claim 1, wherein said component-(A) organopolysiloxane has a polydispersity in respect of molecular weight of 1.0 to 3.0.

10. The heat-fixing silicone rubber roller according to claim 1, wherein said component-(B) organohydrogenpolysiloxane has at least three hydrogen atoms bonded to silicon atoms.

11. The heat-fixing silicone rubber roller according to claim 1, wherein the platinum group metal catalyst of said component-(C) is present in an amount of from 0.1 to 1,000 ppm in terms of platinum group metal based on the weight of the component (A).

12. The heat-fixing silicone rubber roller of claim 1, wherein said silicone rubber layer has a rubber hardness according to JIS K 6249 of 20 or below.

* * * * *